May 19, 1931.     J. C. McCUNE     1,805,630
DYNAMIC AND FLUID PRESSURE BRAKE CONTROL
Filed Jan. 29, 1930
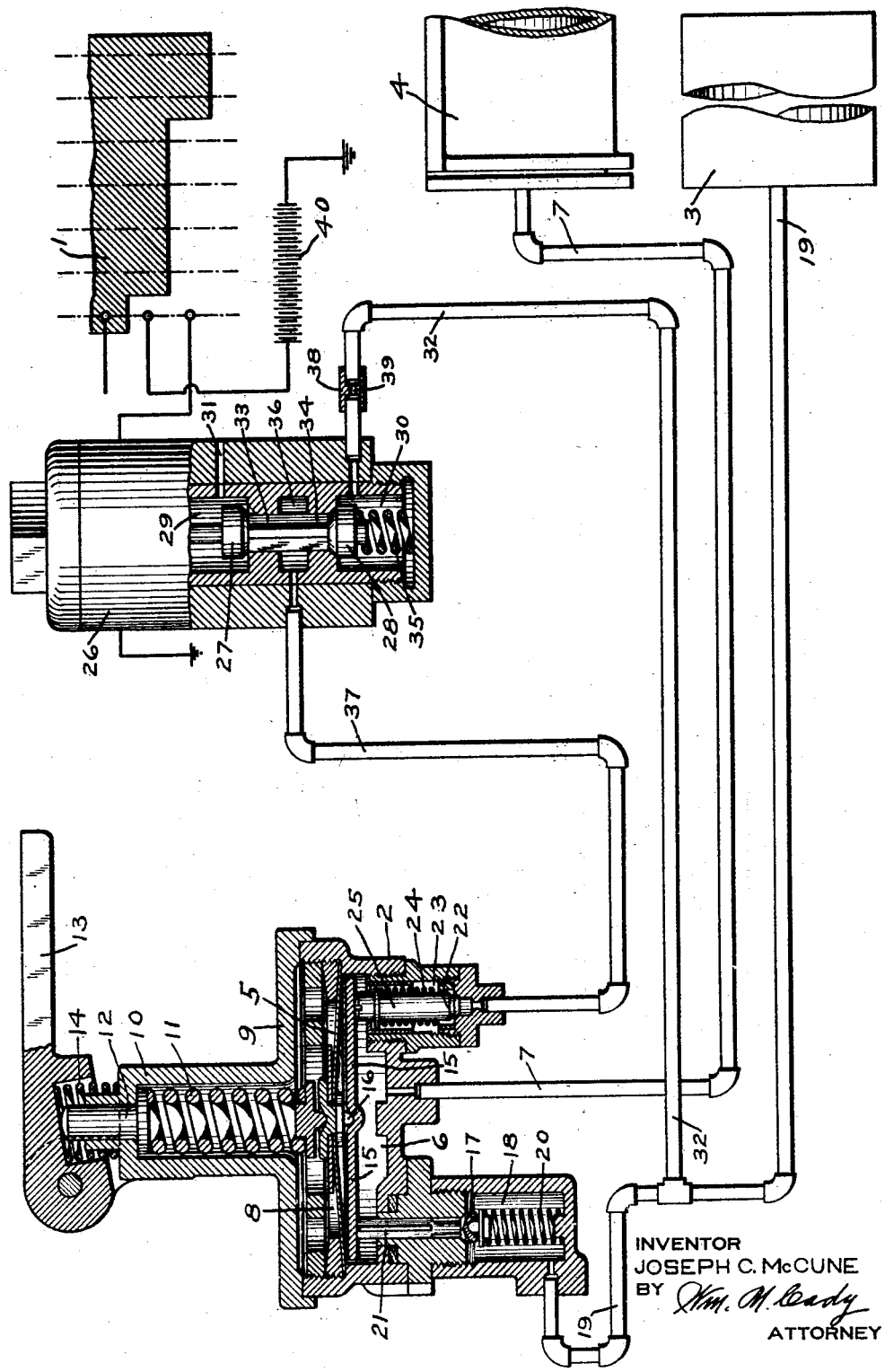
INVENTOR
JOSEPH C. McCUNE
BY
ATTORNEY Patented May 19, 1931

1,805,630

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

DYNAMIC AND FLUID PRESSURE BRAKE CONTROL

Application filed January 29, 1930. Serial No. 424,233.

This invention relates to vehicle brakes, and more particularly to a brake equipment adapted for electro-dynamic braking or fluid pressure braking.

The principal object of my invention is to provide an interlock means between the dynamic brake and the fluid pressure brake, such that under certain conditions, the fluid pressure brake will be automatically applied to supplement the dynamic brake.

In the accompanying drawing, the single figure is a diagrammatic view of a combined dynamic and fluid pressure brake apparatus embodying my invention.

For the purpose of this invention, it is not deemed necessary to show in the drawing an electro-dynamic brake apparatus, since this is well known in the art, and accordingly, only a developed fragment 1 of the usual sequence relay drum is shown, the dotted lines representing the different operating positions of the drum.

The fluid pressure brake apparatus may comprise a brake valve device 2, a source of fluid under pressure, such as the main reservoir 3, and a brake cylinder 4.

The brake valve device 2 comprises a casing in which is mounted a flexible diaphragm 5, the chamber 6 at one side of the diaphragm being connected to a pipe 7 leading to the brake cylinder 4. The chamber 8 at the opposite side of the diaphragm is open to the atmosphere and is closed by a cover plate 9 having a sleeve portion 10 in which is disposed a coil spring 11, operatively engaging the diaphragm 5.

An operating pin 12 engages the upper end of the spring and extends out of the sleeve portion so as to be engaged by a hand or foot operable lever 13, which is pivotally mounted on the sleeve portion 10 and which is urged upwardly by a spring 14.

A rocking bar 15 is disposed in chamber 6 and is operable by the diaphragm 5, through a central pivot button 16. A fluid pressure supply valve 17 is contained in a valve chamber 18, which chamber is connected with the reservoir 3 through a pipe 19 and said valve is urged to its seat by spring 20. The valve 17 has a stem 21 which is adapted to engage the bar 15. A release valve 22 is mounted in valve chamber 23 and is urged away from its seat by a coil spring 24. Said valve is provided with a stem 25 adapted to engage the bar 15.

For interlocking the fluid pressure brake with the dynamic brake, an electro-magnet 26 is provided, which magnet is adapted to operate double beat valves 27 and 28 contained respectively in valve chambers 29 and 30. The valve chamber 29 is open to the atmosphere through port 31 and the valve chamber 30 is connected to a pipe 32, which pipe leads to the main reservoir supply pipe 19. The stems 33 and 34 of the valves 27 and 28 engage and a coil spring 35 urges the valve 28 to its seat and valve 27 away from its seat.

The chamber 36 intermediate the valves 27 and 28 is connected to a pipe 37 which leads to the release valve chamber 23. A choke fitting 38 is disposed in pipe 32 and has a restricted port 39 for limiting the rate of flow of fluid from the main reservoir to valve chamber 30.

The drum 1 is adapted in the last two braking positions to connect a source of current 40 with the magnet 26, so that in these positions of the drum, the magnet 26 will be energized, while in all other positions of the drum, the magnet will be deenergized.

In operation, when the lever 13 is not depressed, as shown in the drawing, the spring 11 does not exert pressure on diaphragm 5, and the spring 24 then acts to hold the release valve 22 unseated. The chamber 6 and the brake cylinder 4 are then connected to pipe 37. If the magnet 26 is not energized, the spring 35 holds the valve 28 seated and the valve 27 unseated, so that pipe 37 is open to exhaust port 31 and therefore the brake cylinder 4 is exhausted to the atmosphere.

The fluid pressure brakes may be applied by depressing the lever 13 either by foot or by hand, so as to compress the spring 11. The diaphragm 5 is then flexed by the pressure of spring 11, so as to first move the release valve 22 to its seat, and then upon further movement of the diaphragm, the bar 15 is rocked on the stem 25 as a fulcrum, so as to unseat the valve 17. Fluid under pressure is then supplied from pipe 19 and the reservoir 3 to the chamber 6 and thence to the brake cylinder 4. When the pressure of fluid supplied to chamber 6 has been increased sufficiently to overcome the pressure of spring 11, the diaphragm 5 is flexed upwardly so as to permit the valve 17 to seat and cut off the further supply of fluid under pressure to the brake cylinder.

The dynamic brake may be set into operation by rotating the drum 1 through its several positions in the usual manner. When the drum has been rotated to its last two positions, the source of current 40 is connected to magnet 26, so that said magnet is energized.

The energization of magnet 26 operates to shift the valve 27 to its seat and to unseat the valve 28, so that fluid under pressure is supplied from the main reservoir 3 to pipe 37. If the brake valve device is in release position, as shown in the drawing, the release valve 22 will be unseated, so that fluid under pressure supplied to pipe 37 is free to flow to chamber 6 and thence through pipe 7 to the brake cylinder 4, thus applying the brakes by fluid under pressure.

In the operation of the dynamic brake, when the brake drum has been rotated to its final position, the speed of the train has been reduced to an extent that the operation of the vehicle motors as generators does not provide adequate braking power to effect the stoppage of the train, but by supplementing the dynamic braking power with fluid pressure braking power as above described, the desired braking force is maintained.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle braking apparatus, the combination with a brake cylinder and a brake valve device for controlling the admission of fluid to the brake cylinder, and having a release valve for controlling the release of fluid from the brake cylinder, means for controlling a dynamic brake, and mechanism controlled by said means for controlling the supply of fluid under pressure to the brake cylinder through a communication controlled by said release valve.

2. In a vehicle braking apparatus, the combination with a brake cylinder and a brake valve device for controlling the admission of fluid to the brake cylinder, and having a release valve for controlling the release of fluid from the brake cylinder, a device for controlling communication through which said release valve exhausts fluid from the brake cylinder and for supplying fluid under pressure to the brake cylinder through a communication controlled by said release valve, and means for controlling the operation of a dynamic brake and operative to control the operation of said device.

3. In a vehicle braking apparatus, the combination with a brake cylinder and a brake valve device for controlling the admission of fluid to the brake cylinder, and having a release valve for controlling the release of fluid from the brake cylinder, a valve device for supplying fluid under pressure to and releasing fluid from the brake cylinder through a communication controlled by said release valve, and means for controlling the operation of a dynamic brake and operative to control the operation of said valve device.

4. In a vehicle braking apparatus, the combination with a brake cylinder and a brake valve device for controlling the admission of fluid to the brake cylinder, and having a release valve for controlling the release of fluid from the brake cylinder, valve means for supplying fluid under pressure to the brake cylinder through a communication controlled by said release valve, an electro-magnet for controlling the operation of said valve means, and a contact drum for controlling the operation of an electro-dynamic brake and having means for controlling the energization and deenergization of said magnet.

5. In a vehicle braking apparatus, the combination with a brake cylinder and a brake valve device for controlling the admission of fluid to the brake cylinder, and having a release valve for controlling the release of fluid from the brake cylinder, valve means for controlling exhaust of fluid from and the supply of fluid under pressure to the brake cylinder through a communication controlled by said release valve, electrically controlled means for controlling the operation of said valve means, and a dynamic brake controlling drum adapted in one position to effect the energization of said electrically controlled means.

6. In a vehicle braking apparatus, the combination with a brake cylinder and a brake valve device for controlling the admission of fluid to the brake cylinder, and having a release valve for controlling the release of fluid from the brake cylinder, valve means for controlling exhaust of fluid from and the supply of fluid under pressure to the brake cylinder through a communication controlled by by said release valve, electrically controlled means for controlling the operation of said valve means, and a dynamic brake controlling drum having sequential braking positions, and adapted in one or more positions to effect the energization of said electrically controlled means.

In testimony whereof I have hereunto set my hand, this 27th day of January, 1930.

JOSEPH C. McCUNE.